US008731912B1

(12) United States Patent
Tickner et al.

(10) Patent No.: US 8,731,912 B1
(45) Date of Patent: May 20, 2014

(54) DELAYING AUDIO NOTIFICATIONS

(71) Applicant: Google Inc., Mountain View, CA (US)

(72) Inventors: Simon Tickner, Whitstable (GB); Peter J Hodgson, London (GB); Richard Z. Cohen, London (GB)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/828,592

(22) Filed: Mar. 14, 2013

Related U.S. Application Data

(60) Provisional application No. 61/753,136, filed on Jan. 16, 2013.

(51) Int. Cl.
*G10L 11/02* (2006.01)

(52) U.S. Cl.
USPC ............................... 704/208; 704/270

(58) Field of Classification Search
USPC ............... 704/226, 233, 275; 379/70, 72, 82, 379/88.12, 88.16, 88.18, 88.19, 88.2, 93.23, 379/127.01, 207.13, 207.15, 207.16, 217.01
See application file for complete search history.

(56) References Cited

U.S. PATENT DOCUMENTS

| | | | |
|---|---|---|---|
| 3,855,574 A | 12/1974 | Welty | |
| 4,670,864 A | 6/1987 | Hoffmann | |
| 4,876,676 A | 10/1989 | Shimizu et al. | |
| 5,111,501 A | 5/1992 | Shimanuki | |
| 5,323,458 A | 6/1994 | Park et al. | |
| 5,765,130 A * | 6/1998 | Nguyen | 704/233 |
| 6,131,044 A | 10/2000 | Ryu | |
| 6,282,268 B1 * | 8/2001 | Hughes et al. | 379/88.03 |
| 6,393,272 B1 * | 5/2002 | Cannon et al. | 455/413 |
| 6,574,601 B1 * | 6/2003 | Brown et al. | 704/270.1 |
| 6,785,382 B2 | 8/2004 | McLaughlin et al. | |
| 6,882,973 B1 * | 4/2005 | Pickering | 704/270 |
| 7,069,221 B2 * | 6/2006 | Crane et al. | 704/275 |
| 7,162,421 B1 * | 1/2007 | Zeppenfeld et al. | 704/233 |
| 7,194,409 B2 * | 3/2007 | Balentine et al. | 704/253 |
| 7,392,188 B2 | 6/2008 | Junkawitsch et al. | |
| 7,437,286 B2 * | 10/2008 | Pi et al. | 704/233 |

OTHER PUBLICATIONS

Wallace, Kevin, "Voice Interface Configuration," ciscopress.com, Oct. 16, 2006, 13 pages, dowloaded from the Internet on Mar. 20, 2013, http://www.ciscopress.com/articles/printerfriendly.asp?p=664150.

Yiu, K.F.C. et al., "An Echo Cancellation Solution for Voice Control Devices," 13th IEEE International Symposium on Consumer Electronics, May 2009.

\* cited by examiner

*Primary Examiner* — Abul Azad
(74) *Attorney, Agent, or Firm* — Fish & Richardson P.C.

(57) ABSTRACT

Methods, systems, and apparatus, including computer programs encoded on a computer storage medium, for audible alert tones are disclosed. The methods, systems, and apparatus include actions of determining whether audio input data received after ceasing output of a first instance of an audible alert tone includes voice activity and determining whether to delay a successive instance of the audible alert tone based on determining whether the audio input data includes voice activity.

19 Claims, 3 Drawing Sheets

DELAYING AUDIO NOTIFICATIONS

CROSS-REFERENCE TO RELATED APPLICATIONS

This application claims the benefit of U.S. Provisional Patent Application No. 61/753,136, filed Jan. 16, 2013.

BACKGROUND

This specification generally relates to speech recognition, and one particular implementation relates to audio output control in relation to voice command input.

Many systems alert the user to a required action through the use of recurring audio tones, such as phone ringtones, timer alarms, and other alerts. These systems may be configured to repeat these audio tones for a prescribed interval or until an action is taken by a user, such as deactivating an alert or answering or declining a phone call.

One avenue for user action is to issue a voice command to a device. However, recurring audio tones can make it difficult or impossible for voice commands to take place because they create a noisy environment which hampers successful recognition of voice commands.

SUMMARY

In general, one innovative aspect of the subject matter described in this specification can be embodied in a system which synchronizes the playback of a repeating alarm tone with periods of an open microphone for voice recognition input. Once voice input is detected, the repeating alarm tone is cancelled or postponed, depending on the outcome of the voice input.

In this way, a user could for example tell an alarm to snooze while they were still in bed, or call out to their ringing phone to tell it to send a call to voicemail or to answer on speakerphone. The device addresses the issue of the alarm tone interfering with the voice commands by evaluating the voice input during periods between alarm tones.

In general, one innovative aspect of the subject matter described in this specification can be embodied in methods that include the actions of determining whether audio input data received after ceasing output of a first instance of an audible alert tone includes voice activity and determining whether to delay a successive instance of the audible alert tone based on determining whether the audio input data includes voice activity Other embodiments of this aspect include corresponding systems, apparatus, and computer programs, configured to perform the actions of the methods, encoded on computer storage devices.

These and other embodiments can each optionally include one or more of the following features. For instance, in some implementations, further actions may include evaluating a transcription of the audio input data based on one or more criteria and determining whether to resume output of the successive instance of the audible alert tone or to cancel output of the successive instance of the audible alert tone based on evaluating the transcription of the audio input data.

In certain aspects, evaluating the transcription of the audio input data includes comparing the transcription to a plurality of accepted voice commands to determine if the transcription includes an accepted voice command. In some aspects, evaluating the transcription includes identifying an accepted voice command and the actions further include canceling the output of the successive instance based on identifying the accepted voice command.

In some aspects evaluating the transcription includes failing to identify an accepted voice command and actions further include outputting a voice command prompt based on failing to identify an accepted voice command. In certain aspects, actions further include evaluating a transcription of further audio input data generated after the voice command prompt, failing to identify an accepted voice command within the further audio input data, and resuming the output of the successive instance based on failing to identify an accepted voice command. In some aspects, failing to identify an accepted voice command includes identifying clipped voice input and outputting the voice command prompt is further based on identifying clipped voice input.

Particular embodiments of the subject matter described in this specification can be implemented so as to realize one or more of the following advantages. Voice commands can be more effectively and reliably used in conjunction with recurring audio tones.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
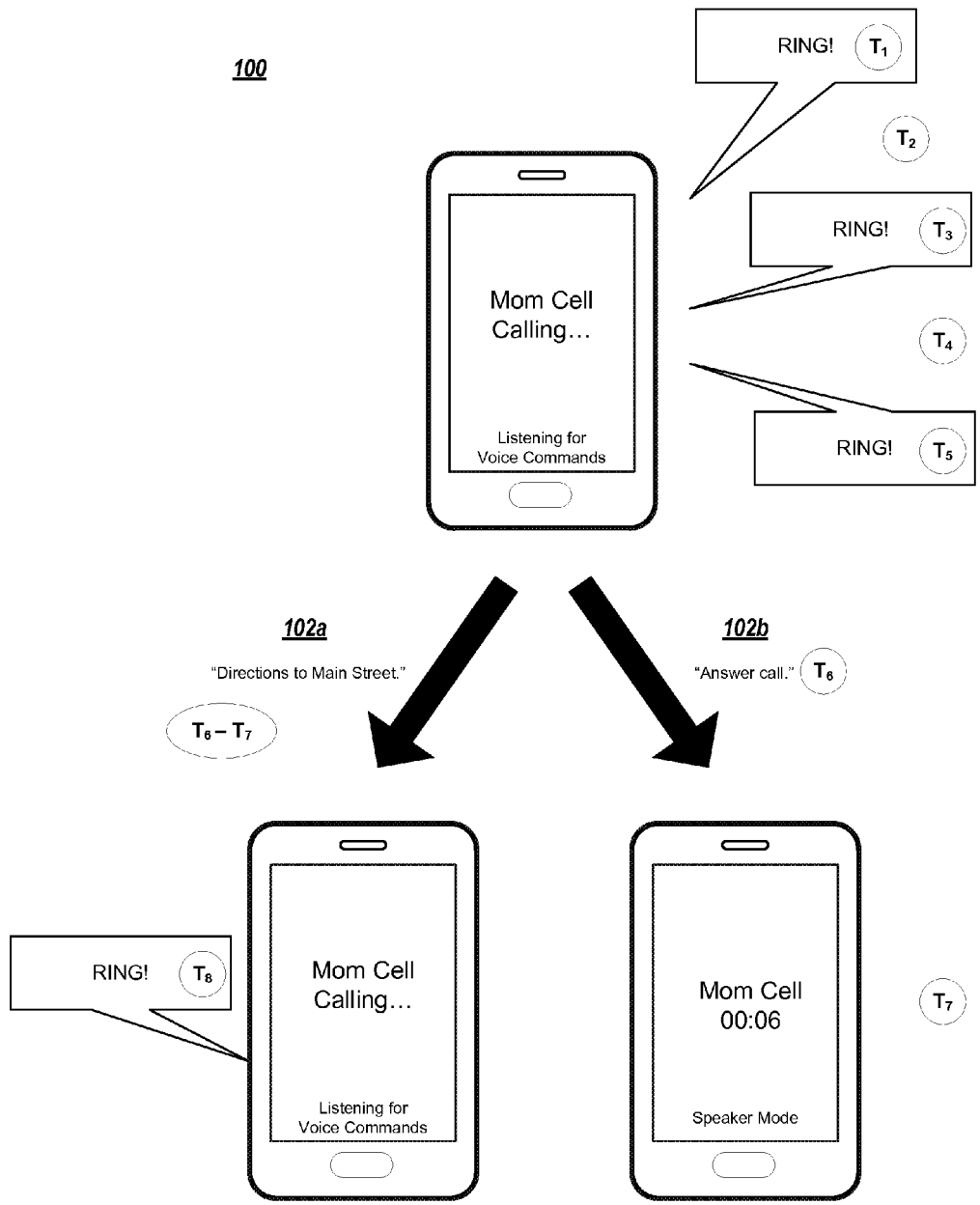
FIG. 1 illustrates a mobile device allowing for voice command input in response to a recurring ringtone output in order to signal an incoming phone call.

FIG. 1 illustrates a mobile device 100 allowing for voice command input in response to a recurring ringtone output in order to signal an incoming phone call.

The mobile device 100 receives an incoming call and responds by initiating and audio alert tone at time $T_1$. The tone is repeated at times $T_3$ and at $T_5$. Between rings, at times $T_2$ and $T_4$, the mobile device 100 is processing audio input and listening for voice commands.

At time $T_6$, following the third ring, the mobile device 100 detects and responds to voice input. FIG. 1 illustrates two different instances based on the receipt of a voice command 102a or a different voice command 102b at time $T_6$.

In one instance, the mobile device 100 detects a voice command 102a, "Directions to Main Street," that is not recognized as an approved voice command in response to the alert tone representing an incoming phone call. The mobile device 100 delays the repeating audio alert tone during time $T_7$, but at $T_8$ the mobile device 100 resumes the audio alert tone.

In another instance, the mobile device 100 detects a voice command 102b, "Answer call," that is recognized as an approved voice command in response to the alert tone representing an incoming phone call. The mobile device 100 identifies and performs the action specified by the command, answering and connecting the incoming call at time $T_7$. The mobile device 100 also discontinues the audio alert as the alert event has been addressed.

Figure 2:
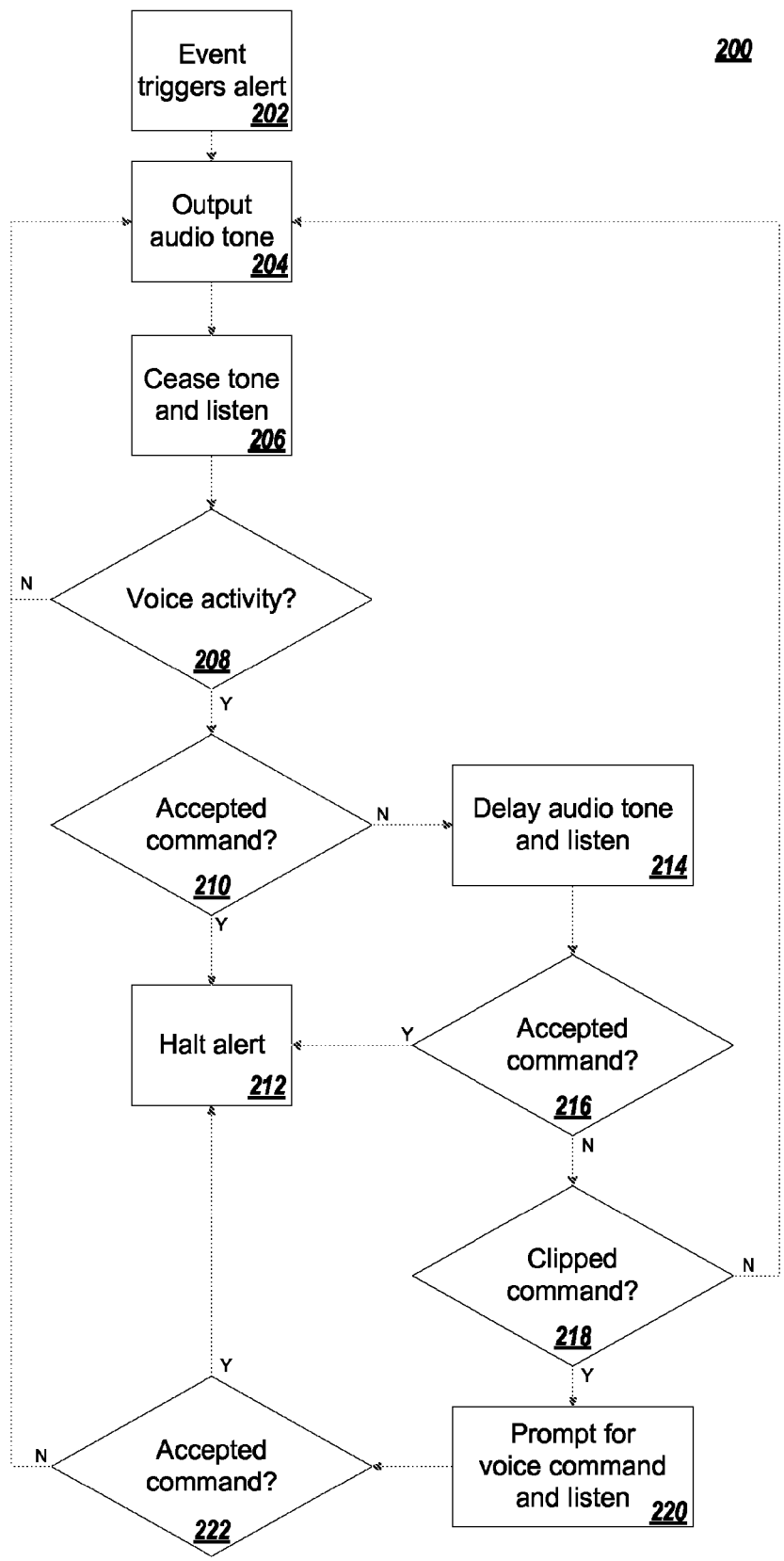
FIG. 2 is a flow diagram illustrating an example process for delaying audio alert tones in response to voice input.

FIG. 2 is a flow diagram illustrating an example process 200 for delaying audio alert tones in response to voice input.

An event triggers an alert (202). An alert event may be any criterion or set of criteria that is set to trigger an alert, and may be set by the user or by the device controlling the example process 200. An alert event may be a communication such as an incoming phone call, text message, email, or instant message; the arrival of a particular date or time as with an alarm clock or calendar reminder; the passing of a set interval of time as with a timer; a detection event such as a door or proximity alarm; a presence event as the arrival of individuals to a meeting room or the arrival online of an instant messaging user; or any other set of criteria that a user may be interested in triggering an alert.

The system outputs an audio tone (204). The audio tone may be any tone appropriate for an alarm, and may be customized by the user as with a ringtone. The audio tone may also include customized elements such as text-to-speech processing to provide audible information to the user regarding the nature of the alert event.

After outputting the audio tone, the system ceases the audio tone and listens for audio input (206). The system may use any appropriate mechanism, such as one or more microphones, to record and process audio input as it comes in.

In some implementations, audio input may be received continually but, in order to avoid the interference of the audio tone, only the audio input received during the times that the audio tone has ceased is analyzed for voice input. In other implementations, the input means may be selectively deactivated and reactivated to only operate during the times that the audio tone has ceased. In either case, by processing audio input received when the audio tone is not playing, interference between the audio input and voice input may be avoided.

The audio input is analyzed to detect the presence or absence of voice activity (208). The audio input may be processed by a variety of known information processing techniques appropriate for audio data before being analyzed for voice activity. In some implementations, only detected voice activity in patterns matching known user patterns may be identified as voice activity. In some implementations, any pattern that matches broad parameters for a human voice may be identified as voice activity.

If voice activity is not detected, then after a predetermined interval, the audio tone is repeated (204), followed by the audio tone ceasing and the system again listening for audio input (206). In some implementations, a set number of these cycles may be played without voice detection before the system halts the alert in order to take a default action.

If voice activity is detected ("Y" at decision block 208), then the voice activity may be analyzed to determine if it represents an accepted command (210). In some implementations, this analysis involves transcribing some or all of the audio input into text, and then evaluating this text against a grammar of accepted commands. In some implementations, the analysis may involve processing the audio input against sound data representing accepted commands. The system may also perform further processing on the audio data in order to more easily process the data as speech input.

If the audio input is found to represent an accepted command ("Y" at decision block 210), then the system halts the alert (212). The system may transition into a process for interacting with the user through voice commands, and may carry out the identified command from the audio input as well as seeking further input from the user. In some implementations, no further audio tones are output in response to the alert event.

If the audio input is not found to represent an accepted command ("N" at decision block 210), then the system delays the next instance of the audio tone and continues to receive audio input (214). Delaying the next instance of the audio tone allows for longer window of time in which the system can analyze audio input without interference from the audio tone output.

The audio input received during the extended window may be analyzed to identify an accepted command (216) as described above with respect to decision block 210. If an accepted command is still not identified ("N" at decision block 216), then the system may analyze the audio input to determine if the data is consistent with a "clipped" command—that is, a fragment of an accepted voice command that indicates a user may have started speaking before the beginning of the analyzed audio input. If the audio data is also not consistent with a clipped command ("N" at decision block 218), then the alert may resume by outputting a further audio tone (214).

If a clipped command is identified ("Y" at decision block 218), then the system may output a prompt for further voice input (220). The prompt may take a number of forms and may include audio output. In some implementations, the prompt may include text-to-speech output that is tailored to the nature of the alert or a candidate for the clipped command. In some implementations, the prompt may include a prompt tone that signals to the user that the system is listening for a voice command.

The system analyzes the audio input received following the prompt to identify an accepted command (222), as above with respect to decision block 210. If no command is identified ("N" at decision block 222), the system may resume the alert by outputting a further audio tone (204). As above, the system may respond to an identified accepted command ("Y" at decision block 222) by halting the alert, cancelling any further audio alert tones in response to the alert event, and carrying out the identified command (212).

Some implementations may reflect variations of the process 200 illustrated by the flowchart of FIG. 2. For example, the audio tone may be delayed before a determination is made as to whether the detected voice activity includes an identified command. In some implementations, a voice prompt may not be used or may be used whenever voice activity is detected without an accepted command being identified. In some implementations, certain steps may be repeated more than once, such as multiple voice prompts being issued before the system resumed the alert tone. In some implementations, the system may delay the audio tone repeatedly if voice activity is detected in order to allow more opportunity to identify voice commands.

In some implementations, the steps of the process 200 may be executed on a substantially "real-time" scale such that a decision as to whether to delay or halt the alert can occur within the interval of silence between alert tones. Audio input may be processed and parsed as it is received. In some implementations, if additional time is needed to analyze audio input, subsequent alert tones may either be output or may be delayed until the system makes a determination regarding the received audio input.

Figure 3:
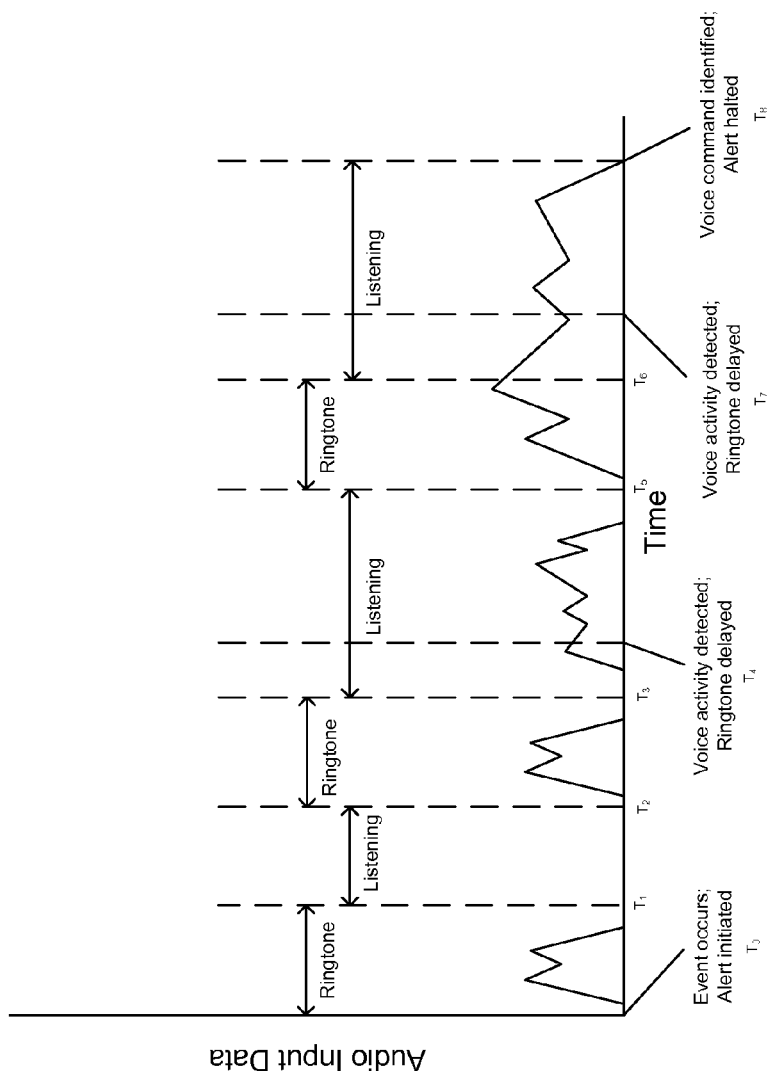
FIG. 3 is a chart illustrating an example of audio input during an alert event.

FIG. 3 is a chart illustrating an example of audio input during an alert event. The audio input data shown on the y-axis of the chart represents an abstract quantity of the total data received during each particular time interval. In some implementations, the audio data itself may include amplitudes at different frequencies and may include more than a single scalar quantity per unit time.

At time $T_0$, an alert event causes the system to begin outputting an alert tone. The audio input data associated with the alert tone itself can be seen between time $T_0$ and time $T_1$. The system is not analyzing the audio input data during this time.

Having ceased to output the alert tone, at time $T_1$ the system begins receiving and analyzing audio input data in order to identify voice activity. No voice activity is identified, and so after a predetermined period of time the system at time $T_2$ ceases listening and outputs another alert tone. The system ceases the audio alert tone and at time $T_3$ begins listening for voice activity again.

At time $T_4$, the system determines that the audio data received so far during the listening period represents voice activity. The system responds by delaying the next audio tone output, which is why the interval between times $T_3$ and $T_5$ is longer than the interval between times $T_1$ and $T_2$. However, the system does not identify a voice command and, at time $T_5$, it again outputs an alert tone which ceases prior to time $T_6$.

The audio data shown between $T_5$ and $T_6$ is illustrated differently than the previous ringtone data to demonstrate that some other sounds were received as input during the audio tone output; however, the system does not resume analyzing the audio output until time $T_6$ as shown. At time $T_7$, the system again detects voice activity and delays the subsequent audio tone. At time $T_8$, the system identifies the audio output over the interval beginning at $T_6$ as including an accepted voice command. The audio alert is halted at time $T_8$.

Although the above examples illustrate a system in which portions of the audio input are ignored when they occur while an audio tone is output, in some implementations, these portions of the audio input may be analyzed by taking into account the particular characteristics of the audio tone that is output for the alert. For example, since the particular characteristics of the sounds output for the alert are known, those sounds may be subtracted from the audio input and any remaining sounds can be analyzed for voice activity. The system may have the ability to compensate for the known audio waveform of specific alert sounds, allowing the system to include the portion of the audio input received during the audio tone in its analysis for voice activity.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
   determining, by one or more processors, whether audio input data received after ceasing output of a first instance of a recurring audible alert tone includes voice activity; and
   determining, by the one or more processors, whether to delay output of a successive instance of the recurring audible alert tone, that by default would occur at a default time after a default time interval, until a delayed time after a delay time interval longer than the default time interval based on determining whether the audio input data includes voice activity.

2. The method of claim 1, further comprising:
   evaluating a transcription of the audio input data based on one or more criteria; and
   determining whether to resume output of the successive instance of the recurring audible alert tone or to cancel output of the successive instance of the recurring audible alert tone based on evaluating the transcription of the audio input data.

3. The method of claim 2, wherein evaluating the transcription of the audio input data comprises comparing the transcription to a plurality of accepted voice commands to determine if the transcription includes an accepted voice command.

4. The method of claim 1, wherein:
   evaluating the transcription comprises failing to identify an accepted voice command; and
   the method further comprises outputting a voice command prompt based on failing to identify an accepted voice command.

5. The method of claim 4, further comprising:
   evaluating a transcription of further audio input data generated after the voice command prompt;

failing to identify an accepted voice command within the further audio input data; and resuming the output of the successive instance based on failing to identify an accepted voice command.

6. The method of claim 4, wherein:

failing to identify an accepted voice command comprises identifying clipped voice input; and outputting the voice command prompt is further based on identifying clipped voice input.

7. The method of claim 1, wherein the recurring audible alert tone comprises a ring tone or alarm tone.

8. The method of claim 1, wherein determining whether to delay output of a successive instance of the audible alert tone comprises:

determining whether to increase a time interval of silence between the first instance and successive instance of the recurring audible alert tone during which no instance of the recurring audible alert tone is output.

9. A system comprising:

one or more computers and one or more storage devices storing instructions that are operable, when executed by the one or more computers, to cause the one or more computers to perform operations comprising:

determining whether audio input data received after ceasing output of a first instance of a recurring audible alert tone includes voice activity; and determining whether to delay output of a successive instance of the recurring audible alert tone, that by default would occur at a default time after a default time interval, until a delayed time after a delay time interval longer than the default time interval based on determining whether the audio input data includes voice activity.

10. The system of claim 9, the operations further comprising:

evaluating a transcription of the audio input data based on one or more criteria; and determining whether to resume output of the successive instance of the recurring audible alert tone or to cancel output of the successive instance of the recurring audible alert tone based on evaluating the transcription of the audio input data.

11. The system of claim 10, wherein evaluating the transcription of the audio input data comprises comparing the transcription to a plurality of accepted voice commands to determine if the transcription includes an accepted voice command.

12. The system of claim 9, wherein:

evaluating the transcription comprises failing to identify an accepted voice command; and the operations further comprise outputting a voice command prompt based on failing to identify an accepted voice command.

13. The system of claim 12, the operations further comprising:

evaluating a transcription of further audio input data generated after the voice command prompt;

failing to identify an accepted voice command within the further audio input data; and resuming the output of the successive instance based on failing to identify an accepted voice command.

14. The system of claim 12, wherein:

failing to identify an accepted voice command comprises identifying clipped voice input; and outputting the voice command prompt is further based on identifying clipped voice input.

15. A non-transitory computer-readable medium storing software comprising instructions executable by one or more computers which, upon such execution, cause the one or more computers to perform operations comprising:

determining whether audio input data received after ceasing output of a first instance of a recurring audible alert tone includes voice activity; and determining whether to delay output of a successive instance of the recurring audible alert tone, that by default would occur at a default time after a default time interval, until a delayed time after a delay time interval longer than the default time interval based on determining whether the audio input data includes voice activity.

16. The medium of claim 15, the operations further comprising:

evaluating a transcription of the audio input data based on one or more criteria; and determining whether to resume output of the successive instance of the recurring audible alert tone or to cancel output of the successive instance of the recurring audible alert tone based on evaluating the transcription of the audio input data.

17. The medium of claim 16, wherein evaluating the transcription of the audio input data comprises comparing the transcription to a plurality of accepted voice commands to determine if the transcription includes an accepted voice command.

18. The medium of claim 15, wherein:

evaluating the transcription comprises failing to identify an accepted voice command; and the operations further comprise outputting a voice command prompt based on failing to identify an accepted voice command.

19. The medium of claim 18, the operations further comprising:

evaluating a transcription of further audio input data generated after the voice command prompt;

failing to identify an accepted voice command within the further audio input data; and resuming the output of the successive instance based on failing to identify an accepted voice command.

* * * * *